(12) United States Patent
Kosen

(10) Patent No.: US 10,014,983 B2
(45) Date of Patent: Jul. 3, 2018

(54) SYSTEM, RECEIVING DEVICE, AND METHOD

(71) Applicant: FUJITSU LIMITED, Kawasaki-shi, Kanagawa (JP)

(72) Inventor: Tadashi Kosen, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/235,527

(22) Filed: Aug. 12, 2016

(65) Prior Publication Data

US 2017/0070316 A1 Mar. 9, 2017

(30) Foreign Application Priority Data

Sep. 7, 2015 (JP) ................................ 2015-175462

(51) Int. Cl.
| | |
|---|---|
| *H03M 13/00* | (2006.01) |
| *H04L 1/08* | (2006.01) |
| *H04L 1/00* | (2006.01) |
| *G06F 11/10* | (2006.01) |
| *H04L 1/18* | (2006.01) |

(52) U.S. Cl.
CPC ............ *H04L 1/08* (2013.01); *G06F 11/1004* (2013.01); *H04L 1/0061* (2013.01); *H04L 1/0083* (2013.01); *H04L 1/1809* (2013.01)

(58) Field of Classification Search
CPC ....... H04L 1/08; H04L 1/0061; H04L 1/0083; H04L 1/1809; G06F 11/1004
See application file for complete search history.

(56) References Cited

U.S. PATENT DOCUMENTS

| | | | |
|---|---|---|---|
| 6,209,046 B1 | 3/2001 | Sato et al. | |
| 2003/0123409 A1* | 7/2003 | Kwak ................... | H04L 1/0061 370/335 |
| 2009/0089644 A1* | 4/2009 | Mead .................... | H03M 13/09 714/758 |
| 2009/0199066 A1* | 8/2009 | Kim ...................... | H04L 1/0065 714/752 |
| 2012/0195327 A1* | 8/2012 | Kim ...................... | H04L 1/0072 370/474 |

FOREIGN PATENT DOCUMENTS

| | | |
|---|---|---|
| JP | 11-45157 | 2/1999 |
| JP | 2000-105675 | 4/2000 |
| JP | 2005-529523 | 9/2005 |
| JP | 2007-514251 | 5/2007 |
| WO | WO 03/105011 A1 | 12/2003 |
| WO | WO 2004/105022 A1 | 12/2004 |

* cited by examiner

*Primary Examiner* — Sam Rizk
(74) *Attorney, Agent, or Firm* — Staas & Halsey LLP

(57) ABSTRACT

A system includes a transmitting device and a receiving device, wherein the transmitting device is configured to transmit a data group including a plurality of data blocks, each of the plurality of data blocks includes a first error check code, and the data group includes a second error check code, and the receiving device is configured to, based on the second error check code, determine whether an error is present in the data group, when it is determined that the error is present in the data group, determine, based on the first error check code, in which data block of the plurality of data blocks the error is present, and when the error is present in a first data block of the plurality of data blocks, transmit, to the transmitting device, a request for retransmission of the first data block among the plurality of data blocks.

14 Claims, 14 Drawing Sheets

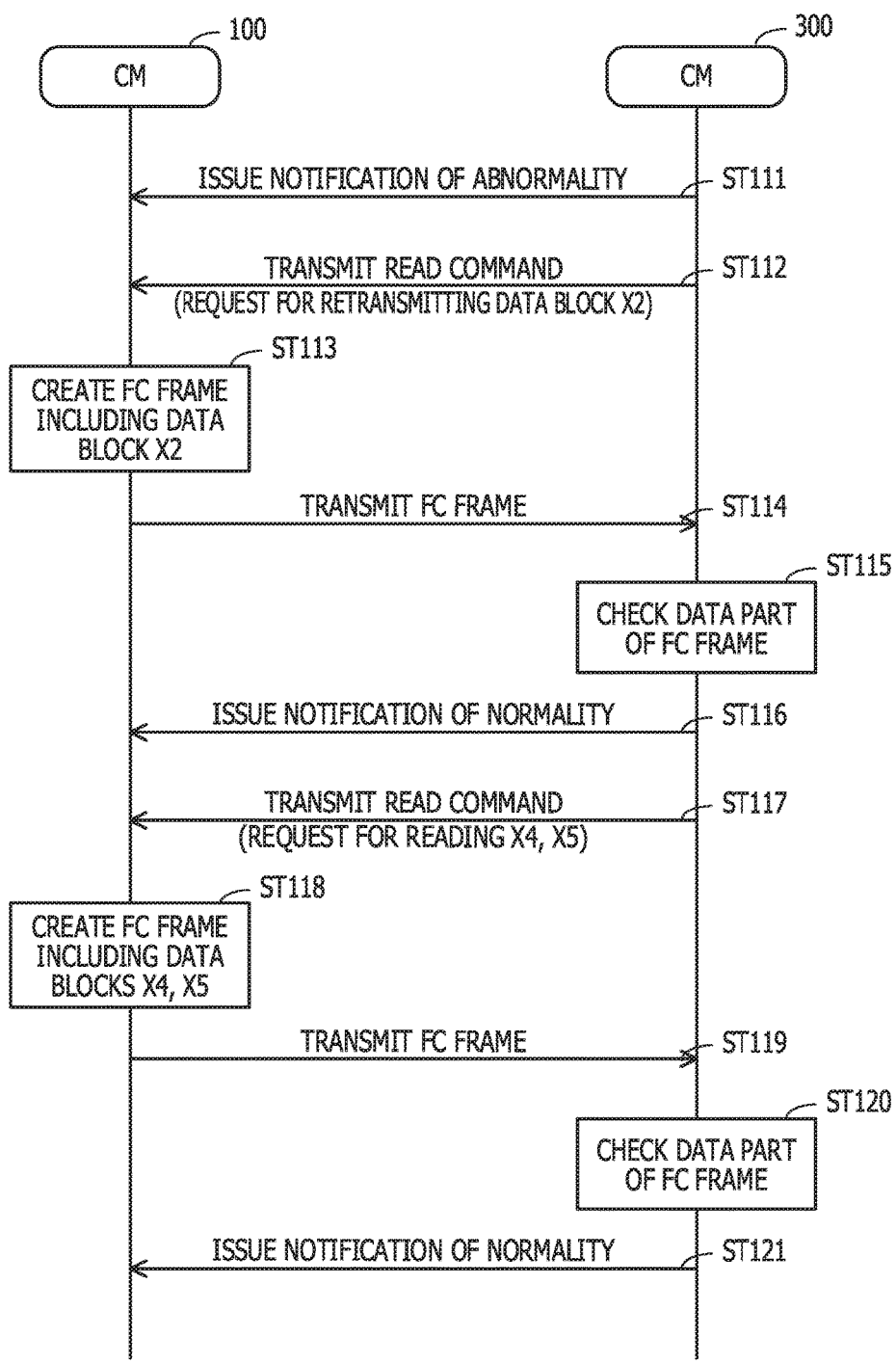

SYSTEM, RECEIVING DEVICE, AND METHOD

CROSS-REFERENCE TO RELATED APPLICATION

This application is based upon and claims the benefit of priority of the prior Japanese Patent Application No. 2015-175462, filed on Sep. 7, 2015, the entire contents of which are incorporated herein by reference.

FIELD

The embodiments discussed herein are related to a system, a receiving device, and a method.

BACKGROUND

There is known a technique for detecting whether or not an error is present in data transmitted and received between a plurality of devices. For example, using a check code, such as a parity bit or a cyclic redundancy check (CRC), makes it possible to detect whether or not an error is present in the data.

Another technique has been proposed regarding error detection as follows. For example, a technique has been proposed in which a CRC is added to data transferred from a host to a hard disk drive (HDD) and, using the CRC, the HDD detects an error in the transferred data. Still another technique has been proposed in which a disk device compares a check code generated based on data transferred from a disk array device with a check code accompanying the transferred data.

Still another technique has been proposed in which when a transmitted packet is lost, only the lost packet is retransmitted. Examples of related-art techniques include Japanese Laid-open Patent Publication No. 11-45157, Japanese Laid-open Patent Publication No. 2000-105675, and Japanese National Publication of International Patent Application No. 2005-529523.

SUMMARY

According to an aspect of the invention, a system includes a transmitting device including a first memory and a first processor coupled to the first memory, and a receiving device including a second memory and a second processor coupled to the second memory, wherein the first processor is configured to transmit a data group including a plurality of data blocks, each of the plurality of data blocks includes a first error check code, and the data group includes a second error check code, and the second processor is configured to receive the data group from the transmitting device, based on the second error check code, determine whether an error is present in the data group, when it is determined that the error is present in the data group, determine, based on the first error check code, in which data block of the plurality of data blocks the error is present, and when the error is present in a first data block of the plurality of data blocks, transmit, to the transmitting device, a request for retransmission of the first data block among the plurality of data blocks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a sequence diagram illustrating the example (2) of the back-up process.

DESCRIPTION OF EMBODIMENTS

When data is transmitted in units of packets, in a data area within a packet, a check code based on data in the data area is often added. In such a case, using a check code, the receiving device checks whether or not an abnormality is absent in data in the data area, and, if an abnormality is present, the receiving device is able to request the transmitting device to retransmit data in the data area.

However, if it is determined based on a check code that an abnormality is present in data in the data area, the abnormality is not necessarily present in the entire data in the data area and some of the data may be normal. Therefore, when data is requested to be retransmitted in units of packets, not only an abnormal portion but also a normal portion of the data in the data area is retransmitted, and thus the time taken for retransmission is increased by an amount corresponding to retransmission of the normal portion. As a result, there is a problem in that the time taken until the receipt of the entirety of the data to be received is complete is increased.

Hereinafter, the present embodiments will be described with reference to the accompanying drawings.

[First Embodiment]

Figure 1:
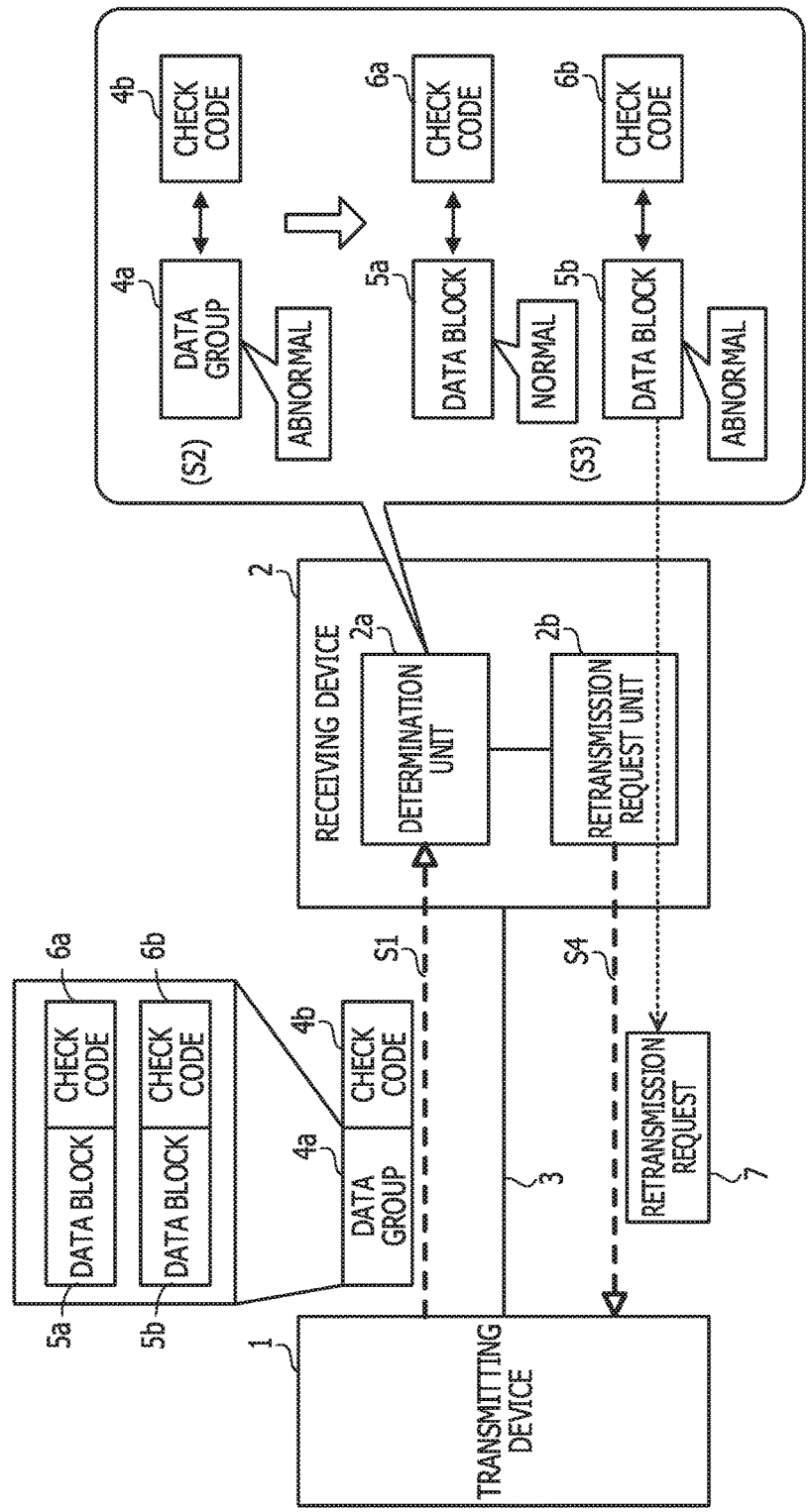
FIG. 1 is a diagram illustrating a communication system of a first embodiment.

FIG. 1 is a diagram illustrating a communication system of a first embodiment. The communication system of the first embodiment includes a transmitting device 1 and a receiving device 2. The transmitting device 1 and the receiving device 2 are coupled over a network 3. For example, when data stored in the transmitting device 1 is desired to be copied to the receiving device 2, communication is performed over the network 3.

The transmitting device 1 transmits a data group 4a and a check code 4b calculated based on the data group 4a to the receiving device 2. The check code 4b is, for example, added to the data group 4a and is transmitted. The check code 4b is, for example, a CRC.

In the data group 4a, actual data to be transmitted from the transmitting device 1 to the receiving device 2 is recorded in such a manner that the actual data is divided into data blocks. In the example of FIG. 1, the data group 4a includes data blocks 5a and 5b. Additionally, the transmitting device 1 transmits a check code 6a calculated based on the data block 5a and a check code 6b calculated based on the data block 5b in such a manner that the check code 6a and the check code 6b are included in the data group 4a. The check codes 6a and 6b are added to, for example, the data blocks 5a and 5b, respectively. The check codes 6a and 6b are, for example, CRCs.

The receiving device 2 includes a determination unit 2a and a retransmission request unit 2b. The determination unit 2a and the retransmission request unit 2b are, for example, processors. The processors may include a central processing unit (CPU), a digital signal processor (DSP), an application specific integrated circuit (ASIC), a field programmable gate array (FPGA), and the like. The determination unit 2a and the retransmission request unit 2b may be a multiprocessor.

The determination unit 2a receives the data group 4a and the check code 4b from the transmitting device 1 (step S1). Then, based on the check code 4b, first, the determination unit 2a determines whether or not the data group 4a is abnormal (step S2).

Here, if it is determined that the data group 4a is abnormal, the determination unit 2a identifies, based on the check codes 6a and 6b, an abnormal data block from among the data blocks 5a and 5b (step S3). That is, the determination unit 2a determines, based on the check code 6a, whether or not the data block 5a is abnormal, and determines, based on the check code 6b, whether or not the data block 5b is abnormal.

Here, it is assumed that the data block 5b has been identified as an abnormal data block. Then, the retransmission request unit 2b requests the transmitting device 1 to retransmit the data block 5b (step S4). In FIG. 1, a request for retransmission of the data block 5b is represented as a retransmission request 7. Although not illustrated in the drawing, in response to this request for retransmission, the transmitting device 1 retransmits the data block 5b to the receiving device 2.

According to the process described above, the receiving device 2 may reduce the time taken for data to be retransmitted, compared with the case where retransmission of abnormal data is requested based only on an abnormal determination result using the check code 4b. That is, when retransmission is performed based only on an abnormal determination result using the check code 4b, the receiving device 2 is unable to determine which portion of the data group 4a is abnormal, and thus the receiving device 2 requests the transmitting device 1 to retransmit the entirety of the data group 4a. In this case, although the data block 5a included in the data group 4a has been able to be normally received by the receiving device 2, the data block 5a is transmitted again from the transmitting device 1. Thus, extra time is taken for the data block 5a to be transmitted again, resulting in increased time to perform retransmission.

In contrast, the receiving device 2 performs an abnormality determination for each of the data blocks 5a and 5b included in the data group 4a, and issues a request for retransmission only of the data block 5b with an abnormality. Thus, the receiving device 2 may reduce the size of data to be retransmitted, reducing the time taken for retransmission. As a result, the receiving device 2 may reduce the time taken until receipt of the entire data to be received from the transmitting device 1 is complete.

[Second Embodiment]

Next, an embodiment in which data copying between storage devices is applied as an example of data transmission from a transmitting device to a receiving device will be described.

Figure 2:
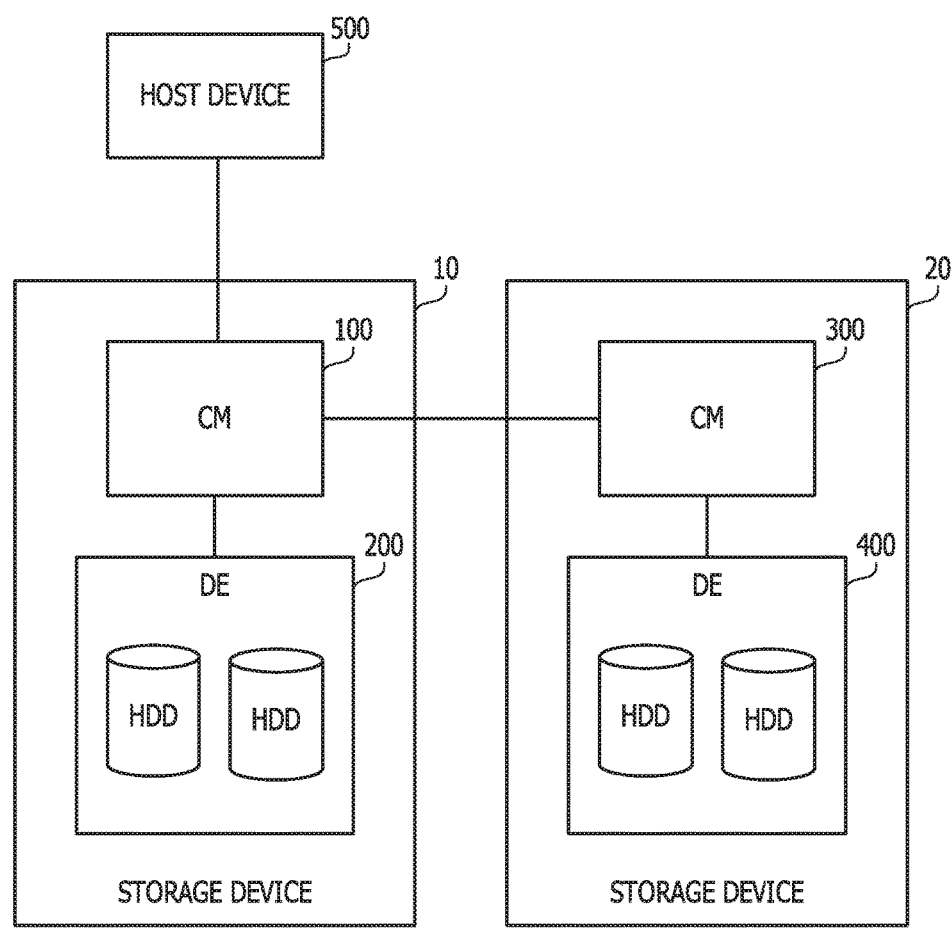
FIG. 2 is a diagram illustrating a storage system of a second embodiment.

FIG. 2 is a diagram illustrating a storage system of a second embodiment. The storage system of the second embodiment includes a storage device 10 and a storage device 20.

The storage device 10 functions as the primary of the storage system. The storage device 20 functions as the secondary of the storage system. In this storage system, to prepare for unexpected disaster, data that is stored in the primary storage device 10 may be backed up in the secondary storage device 20 placed at a remote place. Hereinafter, in some cases, the primary storage device 10 is called a copy-source storage device, and the secondary storage device 20 is called a copy-destination storage device.

The storage device 10 includes a controller module (CM) 100 and a drive enclosure (DE) 200. The storage device 20 includes a CM 300 and a DE 400. The DEs 200 and 400 are equipped with a plurality of HDDs.

The CM 100 and the CM 300 are, for example, coupled over a storage area network (SAN) using a Fibre Channel (FC) or the like.

A host device 500 is coupled to the CM 100. The CM 100 and the host device 500 are, for example, coupled over the SAN using the FC. The CM 100 controls data access to the DE 200 in response to a request from the host device 500. For example, the CM 100 creates a logical volume and accepts access to the logical volume from the host device 500. The CM 100 secures a physical storage area, which corresponds to the logical volume, in the DE 200, and writes, to the corresponding storage area in the DE 200, data requested from the host device 500 to be written to the logical volume. Regarding the data of the logical volume, writing of the data to the storage area in the DE 200 may be controlled by redundant arrays of inexpensive disks (RAID).

Additionally, the CM 100 transmits data stored in the DE 200 to the CM 300 so as to cause the data to be backed up. The CM 300 backs up the data transmitted from the CM 100 in the DE 400. For example, the CM 300 transmits, to the CM 100, a read request specifying the storage area of the logical volume created in the CM 100. Data in accordance with the read request is transmitted from the CM 100, and the CM 300 writes the transmitted data to a storage area secured in the DE 400 in association with the logical volume. Thereby, remote copying of the logical volume is achieved.

Figure 3:
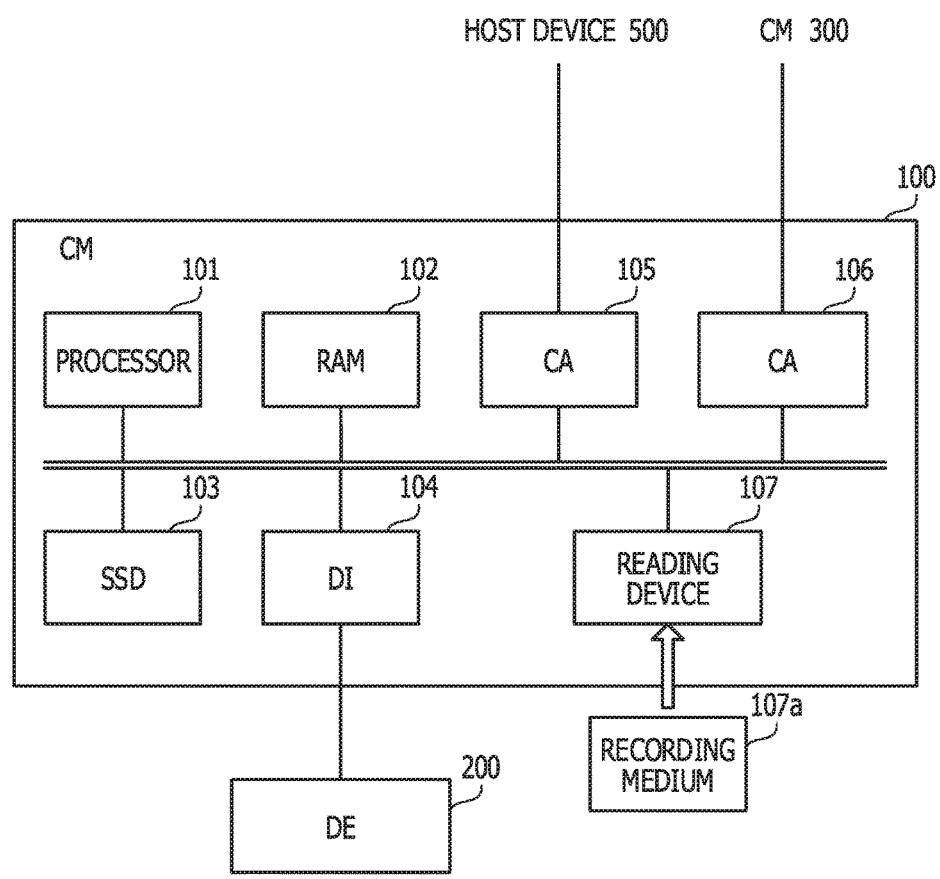
FIG. 3 is a diagram illustrating an example of hardware of a CM.

FIG. 3 is a diagram illustrating an example of hardware of a CM. The CM 100 includes a processor 101, random access memory (RAM) 102, a solid state drive (SSD) 103, a drive interface (DI) 104, a channel adapter (CA) 105, a CA 106, and a reading device 107.

The processor 101 controls information processing of the CM 100. The processor 101 may be a multiprocessor including a plurality of processing elements.

The RAM 102 is the main storage device of the CM 100. The RAM 102 temporarily stores at least some of programs of an operating system (OS) and application programs that the processor 101 is caused to execute. The RAM 102 also stores various types of data that are used for processing performed by the processor 101.

The SSD 103 is an auxiliary storage device of the CM 100. The SSD 103 is nonvolatile semiconductor memory. In the SSD 103, programs, various types of data, and the like that the processor 101 is caused to execute are stored.

The DI 104 is an interface for communicating with the DE 200. The CA 105 is an interface for communicating with the host device 500. The CA 106 is an interface for communicating with the CM 300.

The reading device 107 is a device that reads a program or data recorded on a portable recoding medium 107a. As the recording medium 107a, for example, a magnetic disk such as a flexible disk (FD) or an HDD, an optical disc such as a compact disc (CD) or a digital versatile disc (DVD), or a magneto-optical (MO) disk may be used. Additionally, as the recording medium 107a, for example, nonvolatile semiconductor memory such as a flash memory card may be used. The reading device 107 transmits a program or data read from the recording medium 107a to the processor 101, for example, in compliance with an instruction from the processor 101.

Note that the CM 300 may be embodied by hardware similar to that of the CM 100.

Figure 4:
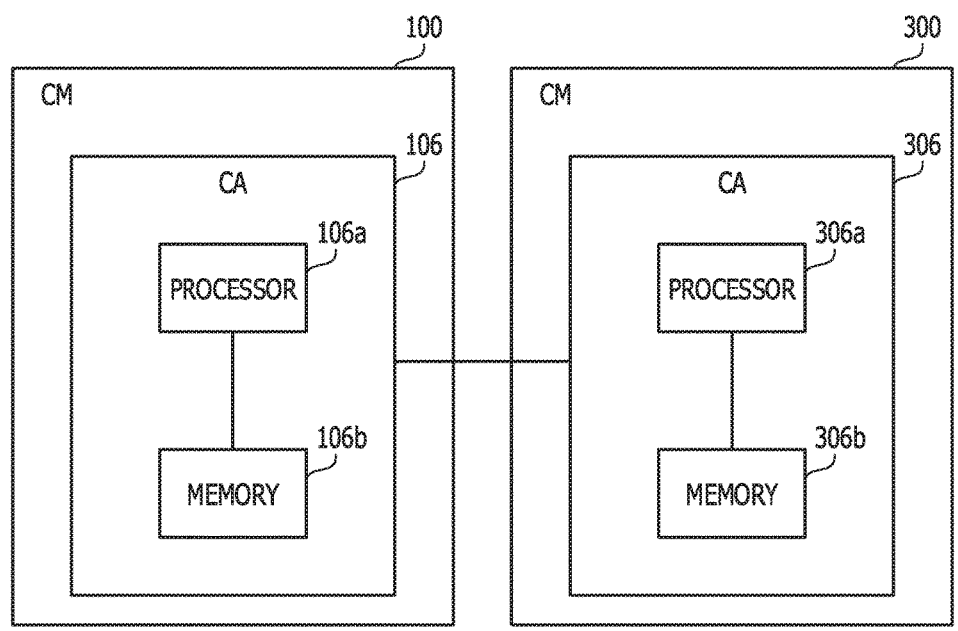
FIG. 4 is a diagram illustrating an example of hardware of a CA.

FIG. 4 is a diagram illustrating an example of hardware of the CA. FIG. 4 illustrates an example of hardware of the CA 106 included in the CM 100 and a CA 306 included in the CM 300. Note that, in FIG. 4, other hardware included in the CMs 100 and 300 is not illustrated.

The CA 106 includes a processor 106a and memory 106b. The processor 106a executes a firmware program to centrally control the CA 106. Additionally, the processor 106a generates an FC frame described below and communicates with the CM 300 using the FC frame. The memory 106b is volatile semiconductor memory. For example, the memory 106b is RAM. The memory 106b stores various types of data that are used for processing performed by the processor 106a.

The CA 306 may be embodied by hardware similar to that of the CA 106. That is, the CA 306 includes a processor 306a and memory 306b. The processor 306a generates an FC frame and communicates with the CM 100 using the FC frame.

Note that the CM 100 is an example of the transmitting device 1 of the first embodiment, and the CM 300 is an example of the receiving device 2 of the first embodiment. Additionally, the CA 106 or the storage device 10 may be an example of the transmitting device 1, and the CA 306 or the storage device 20 may be an example of the receiving device 2.

Figure 5:
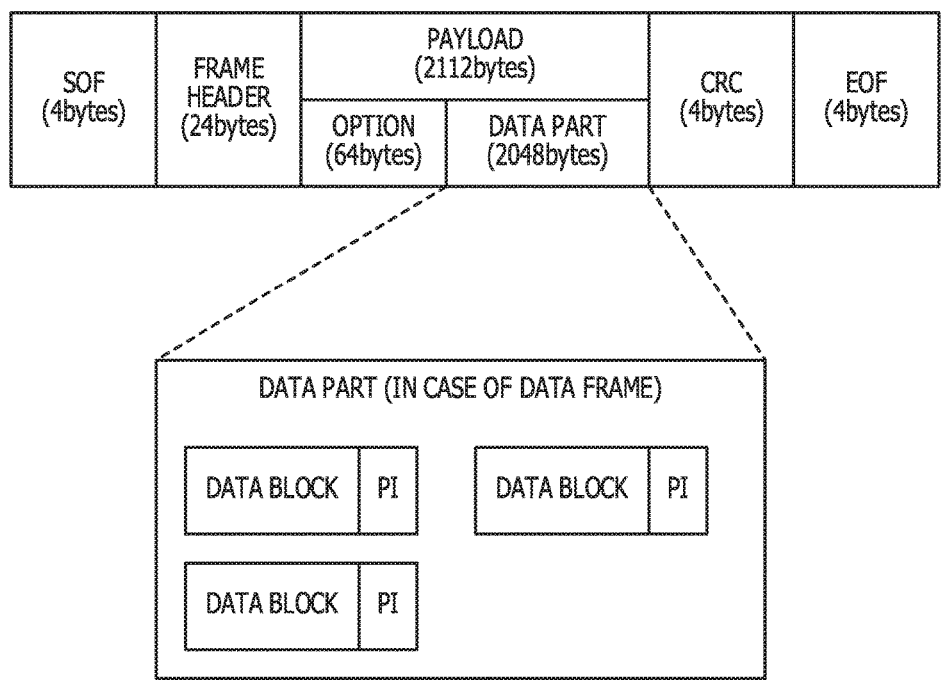
FIG. 5 is a diagram depicting an FC frame.

FIG. 5 is a diagram depicting an FC frame. FIG. 5 is a diagram depicting an FC frame that the processor 106a or 306a generates. An FC frame is used for communication between the CM 100 and the CM 300.

The FC frame includes, in order from the top, a start of frame (SOF) (4 bytes), a frame header (24 bytes), a payload (2112 bytes), a CRC (4 bytes), and an end of frame (EOF) (4 bytes). The payload also includes an option (64 bytes) and a data part (2048 bytes).

In the SOF, information indicating the beginning of the FC frame is recorded. In the frame header, the addresses of the transmission source and the transmission destination, information indicating the type of the FC frame, and the like are recorded. In the payload, information on small computer system interface (SCSI) commands is mainly recorded. In the CRC, a check code for detecting an error in data in the data part is recorded. For example, the remainder left when data in the data part is divided by a given constant is recorded in the CRC. In the EOF, information indicating the end of the FC frame is recorded.

Examples of the types of an FC frame include a command frame, a data frame, and a response frame. In the data part of the payload in the command frame, an SCSI command such as a read command or a write command is recorded. In the data part of the payload in the data frame, actual data requested by an SCSI command to be read or written is recorded. In the data part of the payload in the response frame, information indicating whether or not processing requested by an SCSI command is normally complete is recorded.

Here, actual data transmitted from the CM 100 to the CM 300 using a data frame is divided into a plurality of data blocks. The size of one data block is 512 bytes. In the present embodiment, protection information (PI) defined with the T10-data integrity field (DIF) is added to a data block. PI is protection information of 8 bytes. The combined volume of a data block and PI is 520 bytes, and thus, as depicted at the bottom of FIG. 5, up to three data blocks with PI may be recorded in the data part of the payload in the data frame.

Note that the size of the data part of the payload in the data frame is variable with an upper limit of 2048 bytes. Further, in a command frame for transmitting a read command, it is allowed to specify the number of data blocks that are stored in the data part of the payload in the corresponding data frame. For example, when the number of data blocks is specified to be "1", the data part of the payload in the data frame is reduced to 520 bytes.

Figure 6:
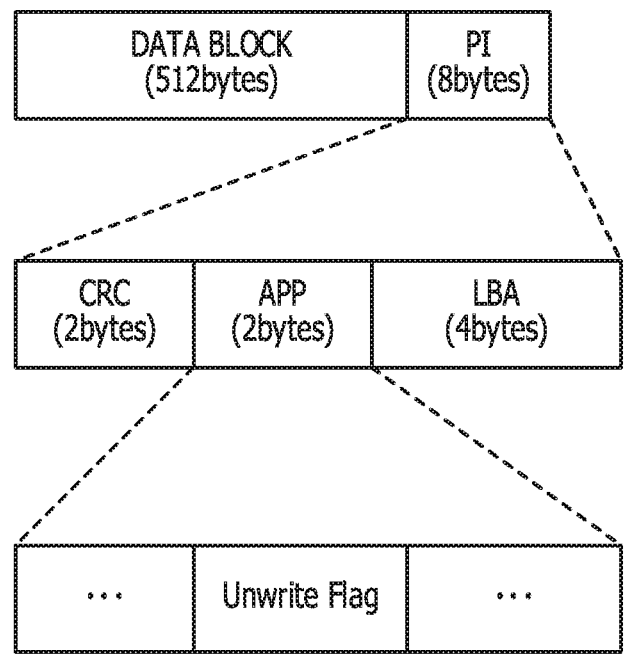
FIG. 6 is a diagram depicting a format of PI.

FIG. 6 is a diagram depicting a format of PI. PI added to a data block includes a CRC (2 bytes), an application tag (APP) (2 bytes), and a logical block address (LBA) (4 bytes). In the CRC, a check code for detecting whether or not an error is present in the data block is recorded. For example, the remainder left when the data block is divided by a given constant is recorded in the CRC. In the APP, arbitrary information is registered. In the LBA, an LBA indicating the location of the data block is registered.

In the present embodiment, an unwrite flag of 1 bit is recorded in the APP. The unwrite flag indicates whether or not a read-source storage area indicated by the address of a data block is an unwritten area. If the unwrite flag is true (for example, one), the flag indicates that the data block is the data of an unwritten area (zero data) and valid data is not contained. If the unwrite flag is false (for example, zero), the flag indicates that the data block is not the data of an unwritten area. Note that, in the present embodiment, the read-source area of a data block is the storage area of the logical volume. If the unwrite flag is true, the data block is data read from an unwritten area in the logical volume.

Figure 7:
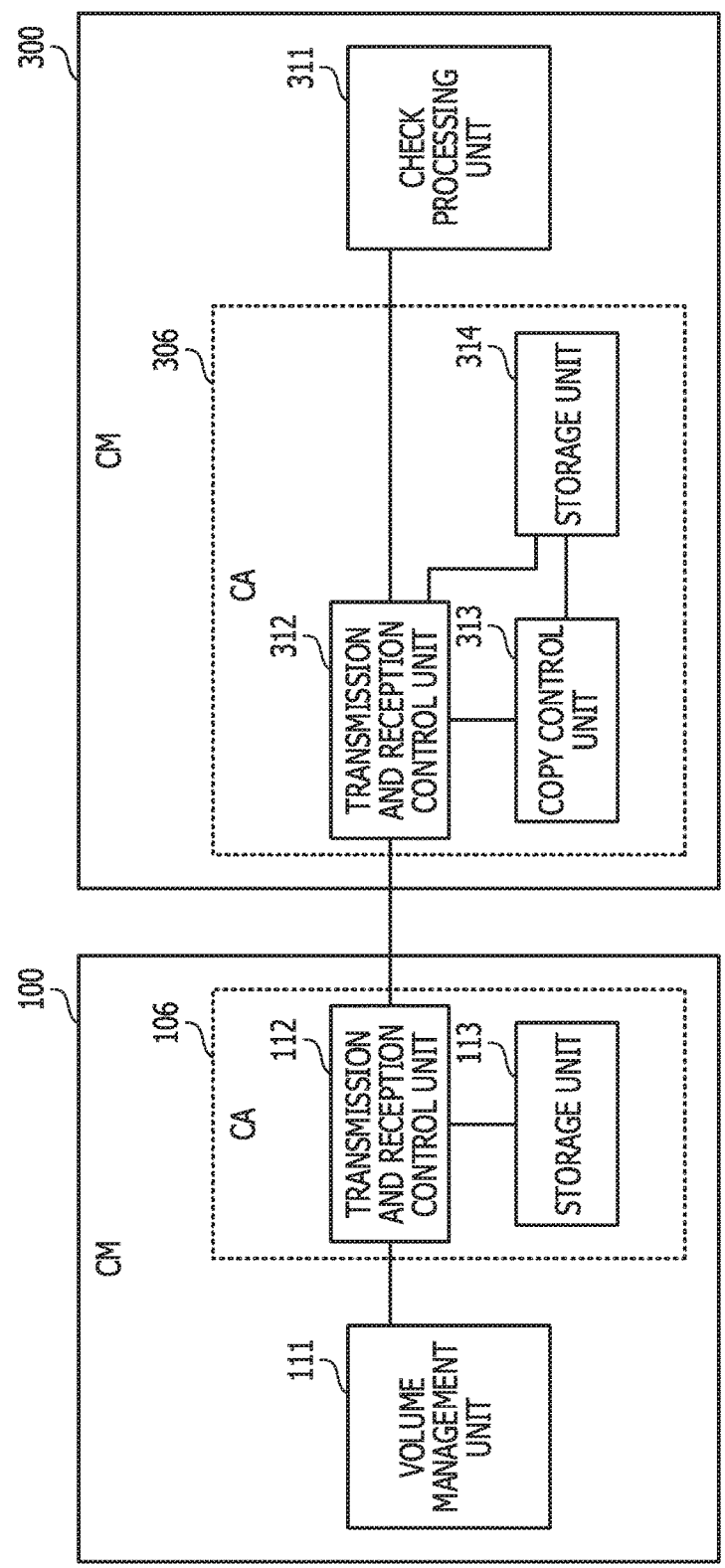
FIG. 7 is a diagram illustrating an example of functionality of CMs.

FIG. 7 is a diagram illustrating an example of functionality of CMs. In conjunction with FIG. 7, an example of the functionality of the CM 100 and the CM 300 will be described. The CM 100 includes a volume management unit 111, a transmission and reception control unit 112, and a storage unit 113.

The processing of the volume management unit 111 is, for example, achieved by the processor 101 of the CM 100 executing a given application program. The volume management unit 111 controls access to the logical volume from the host device 500. For example, the volume management unit 111 secures a physical storage area corresponding to the logical volume within the DE 200, and writes, to the corresponding storage area in the DE 200, data requested from the host device 500 to be written to the logical volume. The volume management unit 111 may also control access to the logical volume from the host device 500, using the RAM 102 as cache memory. Further, the volume management unit 111 reads data requested through the CA 106 from the CM 300 to be copied (read), from among data included in the logical volume, from the DE 200 (or cache memory) and transfers the read data to the CA 106.

Processing of the transmission and reception control unit 112 is, for example, achieved by the processor 106a of the CA 106 executing a given firmware program. The transmission and reception control unit 112 acquires, from the volume management unit 111, data requested to be read for copying from the CM 300, and transmits the data to the CM 300 using an FC frame. The transmission and reception control unit 112 divides the data requested to be read into data blocks, and adds PI to each data block and stores the data block in the FC frame.

The storage unit 113 is, for example, implemented as a storage area secured in the memory 106b of the CA 106. The storage unit 113 temporarily stores data that the transmission and reception control unit 112 will transmit to the CM 300.

The CM 300 includes a copy control unit 311, a transmission and reception control unit 312, a check processing unit 313, and a storage unit 314.

Processing of the copy control unit 311 is, for example, achieved by the main processor of the CM 300 executing a given application program. The copy control unit 311 executes copy processing for backing up data of the logical volume created in the CM 100. The copy control unit 311 notifies the transmission and reception control unit 312 of the address of an area to be copied in the logical volume, and instructs the transmission and reception control unit 312 to read data in the area from the CM 100. The copy control unit 311 writes, to the DE 400, the data read from the CM 100 in accordance with the instruction and transmitted.

Processing of the transmission and reception control unit 312 and the check processing unit 313 is, for example, achieved by the processor 306a of the CA 306 executing a given firmware program. The transmission and reception control unit 312 transmits, in accordance with an instruction from the copy control unit 311, a read command to the CM 100. The transmission and reception control unit 312 causes the check processing unit 313 to check whether or not an abnormality is absent for an FC frame (data frame) transmitted from the CM 100 in accordance with the read command. The transmission and reception control unit 312 delivers, to the copy control unit 311, a data block in which it is determined that an abnormality is absent. Additionally, the transmission and reception control unit 312 requests the CM 100 to retransmit a data block in which it is determined that an abnormality is present.

The check processing unit 313 checks whether or not an abnormality is absent for data that the transmission and reception control unit 312 has received from the CM 100. Specifically, with the CRC of an FC frame received from the CM 100, the check processing unit 313 determines whether or not data recorded in the payload of the FC frame is abnormal. If it is determined that the data recorded in the payload of the FC frame is abnormal, then, with the CRC of the PI added to a data block, the check processing unit 313 determines whether or not the data block is abnormal. If it is determined that the data block is abnormal, the check processing unit 313 determines whether or not the unwrite flag of the PI added to the data block is true. If the unwrite flag is true, the check processing unit 313 repairs the data block as zero data. If the unwrite flag is false, the check processing unit 313 determines that the data block is an abnormal data block.

The storage unit 314 is, for example, implemented as a storage area secured in the memory 306b of the CA 306. The storage unit 314 temporarily stores data received from the CM 100 by the transmission and reception control unit 312.

Next, copy processing from the CM 100 to the CM 300 performed for the CM 300 to back up data of the logical volume will be described with reference to a flowchart.

Figure 8:
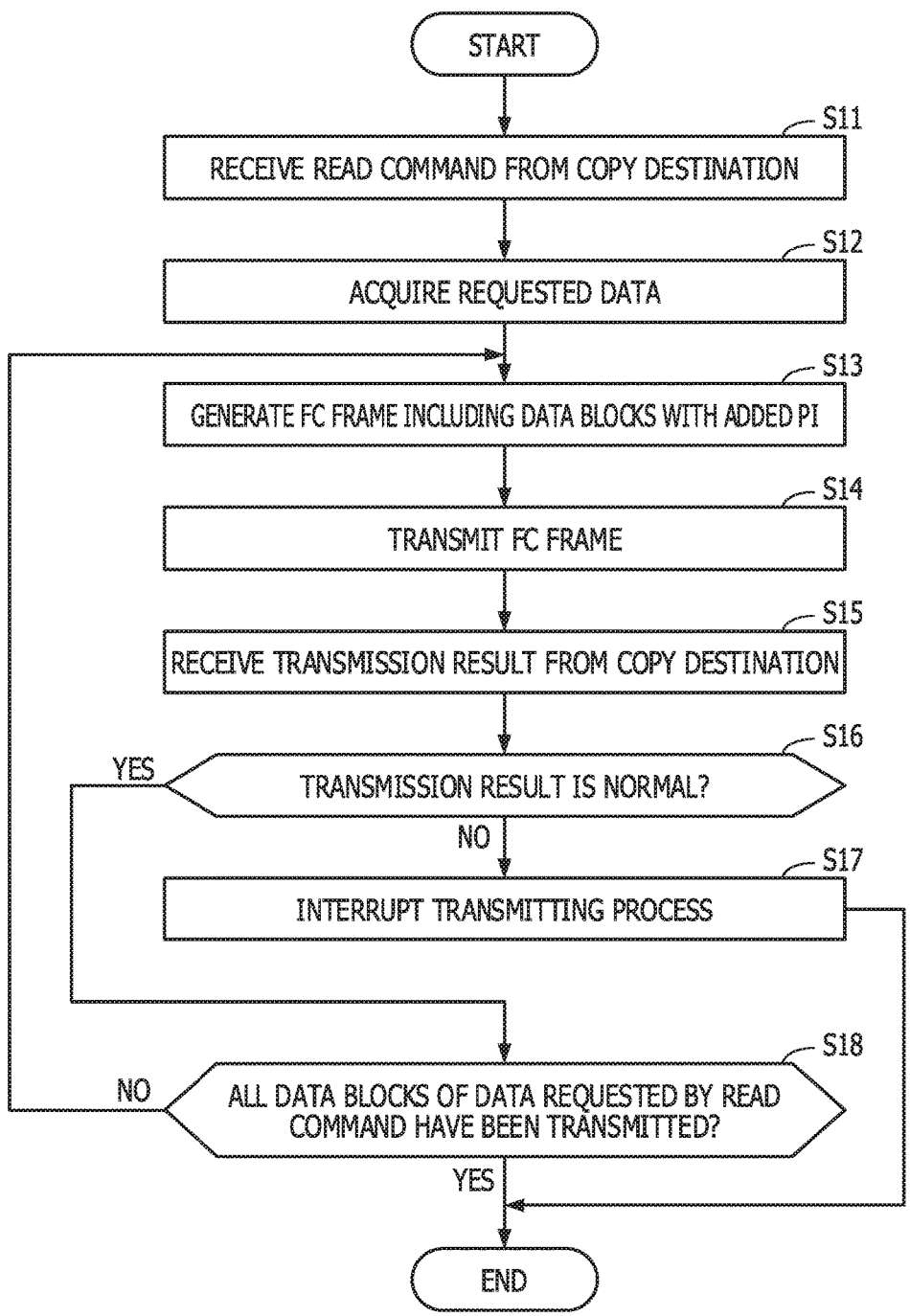
FIG. 8 is a flowchart illustrating an example of a data transmitting process of a copy source.

FIG. 8 is a flowchart illustrating an example of a data transmitting process of a copy source. Hereinafter, the process illustrated in FIG. 8 will be described in order of step numbers.

(S11) The transmission and reception control unit 112 receives an FC frame (command frame) including a read command from the CM 300 serving as the command destination. In the read command, a logical unit number (LUN) specifying a logical volume, the top LBA indicating a read area, and a data length are included.

(S12) The transmission and reception control unit 112 notifies the read area indicated by the read command to the volume management unit 111. The volume management unit 111 reads, from the DE 200 (or cache memory), data recorded in the notified read area, and transmits the data to the transmission and reception control unit 112. The transmission and reception control unit 112 acquires the read data and stores the data in the storage unit 113.

(S13) The transmission and reception control unit 112 refers to the data part of the FC frame received in step S11 and determines the number of data blocks to be stored in the data part of the data frame. The transmission and reception control unit 112 selects only a number of untransmitted data blocks equal to the determined number of data blocks, from among data requested to be read in step S11, from its top end.

Typically, the largest number of data blocks, "3", is recorded in the data part of the FC frame received in step S11. In this case, the transmission and reception control unit 112 selects the top three untransmitted data blocks. However, when the number of untransmitted data blocks is less than three, all of them are selected, and the number of selected data blocks is less than three. On the other hand, if the read command received in step S11 is a command that makes a request for retransmission, "2" or "1" is recorded as the number of data blocks in some cases.

The transmission and reception control unit 112 adds PI to each selected data block. Specifically, the transmission and reception control unit 112 records, in the CRC of the PI, the remainder left when the data block is divided by a given constant. The transmission and reception control unit 112 refers to the data block and records information indicating whether or not the data block is zero data, in the unwrite flag of the PI. The transmission and reception control unit 112 records an LBA indicating the location of the data block, in the LBA of the PI.

The transmission and reception control unit 112 generates an FC frame (data frame) including data blocks with the added PI. At this point, the transmission and reception control unit 112 records, in the CRC of the FC frame, the remainder left when data of a payload including the data block with the added PI is divided by a given constant. Additionally, the transmission and reception control unit 112 varies the length of the data part in the FC frame that is generated, in accordance with the number of data blocks recorded in the data part of the FC frame received in step S11. For example, when the number of data blocks is "1", the transmission and reception control unit 112 sets the length of the data part to a length that allows for recording of only one pair of a data block and PI.

(S14) The transmission and reception control unit 112 transmits the FC frame to the CM 300.

(S15) The transmission and reception control unit 112 receives a transmission result for the FC frame transmitted in step S14, from the CM 300 serving as the copy destination.

(S16) The transmission and reception control unit 112 determines whether or not the transmission result is normal. If normal, the process proceeds to step S18. If abnormal, the process proceeds to step S17.

(S17) The transmission and reception control unit 112 interrupts the data transmitting process in accordance with the read command received in step S11. Thus, the process in FIG. 8 is completed, and once a new read command is transmitted from the CM 300, the process in FIG. 8 is executed.

(S18) The transmission and reception control unit 112 determines whether or not all the data blocks of the data requested, by the read command received in step S11, to be read have been transmitted. If transmitted, the process is completed. If not transmitted, the process proceeds to step S13.

Figure 9:
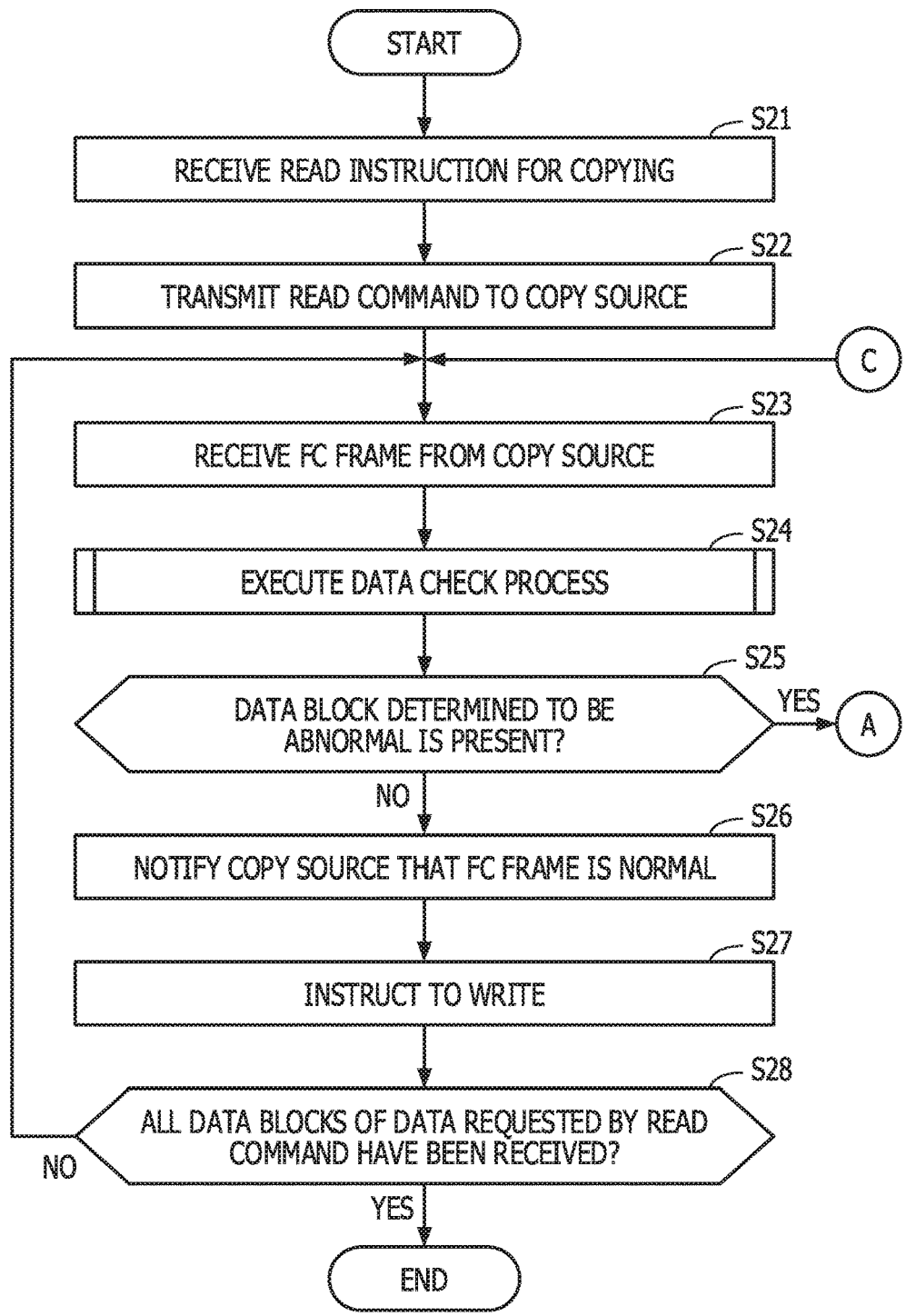
FIG. 9 is a flowchart illustrating an example (1) of a data receiving process of a copy destination.

FIG. 9 is a flowchart illustrating an example (1) of a copy receiving process of a copy destination. Hereinafter, the process illustrated in FIG. 9 will be described in order of step numbers.

(S21) The copy control unit 311 notifies the transmission and reception control unit 312 of the address of an area to be copied in the logical volume and instructs the transmission and reception control unit 312 to read data of the area from the CM 100. The transmission and reception control unit 312 receives the read instruction from the copy control unit 311.

(S22) The transmission and reception control unit 312 transmits an FC frame (command frame) including a read command to the CM 100 serving as the copy source. In the command frame, a LUN, the top LBA, and the data length specified by the copy control unit 311 are included. Additionally, as the number of data blocks that are stored in the data part of the data frame, the largest number, "3", is specified.

(S23) The transmission and reception control unit 312 receives an FC frame (data frames) from the CM 100 serving as the copy source. The transmission and reception control unit 312 stores the received FC frame in the storage unit 314. Note that the FC frame received in this step, S23, is an FC frame transmitted from the CM 100 in accordance with the read command transmitted in step S22 or in step S44 in FIG. 11.

(S24) The check processing unit 313 determines whether or not an abnormality is present in data blocks included in the FC frame received in step S23. Details of this determination process will be described in conjunction with FIG. 12. The check processing unit 313 notifies the determination result to the transmission and reception control unit 312.

(S25) The transmission and reception control unit 312 determines, based on the determination result notified from the check processing unit 313, whether or not a data block determined to be abnormal is present in the FC frame received in step S23. If present, the process proceeds to step S31 in FIG. 10. If not present, the process proceeds to step S26.

(S26) The transmission and reception control unit 312 notifies the CM 100 that the FC frame is normal.

(S27) The transmission and reception control unit 312 transmits normal data blocks stored in the storage unit 314 to the copy control unit 311 and instructs the copy control unit 311 to write the data blocks. The copy control unit 311 writes the received data blocks to given areas of the DE 400. Thus, data of the logical volume corresponding to the received data blocks is backed up. Note that the copy control unit 311 may once write the received data blocks to a cache area of RAM of the CM 300 and then write these data blocks to the DE 400.

(S28) The transmission and reception control unit 312 determines whether or not all the data blocks of data requested, by the read command transmitted in step S22 or in step S44 in FIG. 11 described below, to be read have been received. If all the data blocks have been received, the process is completed. If a data block that has not been received is present, the process proceeds to step S23.

Figure 10:
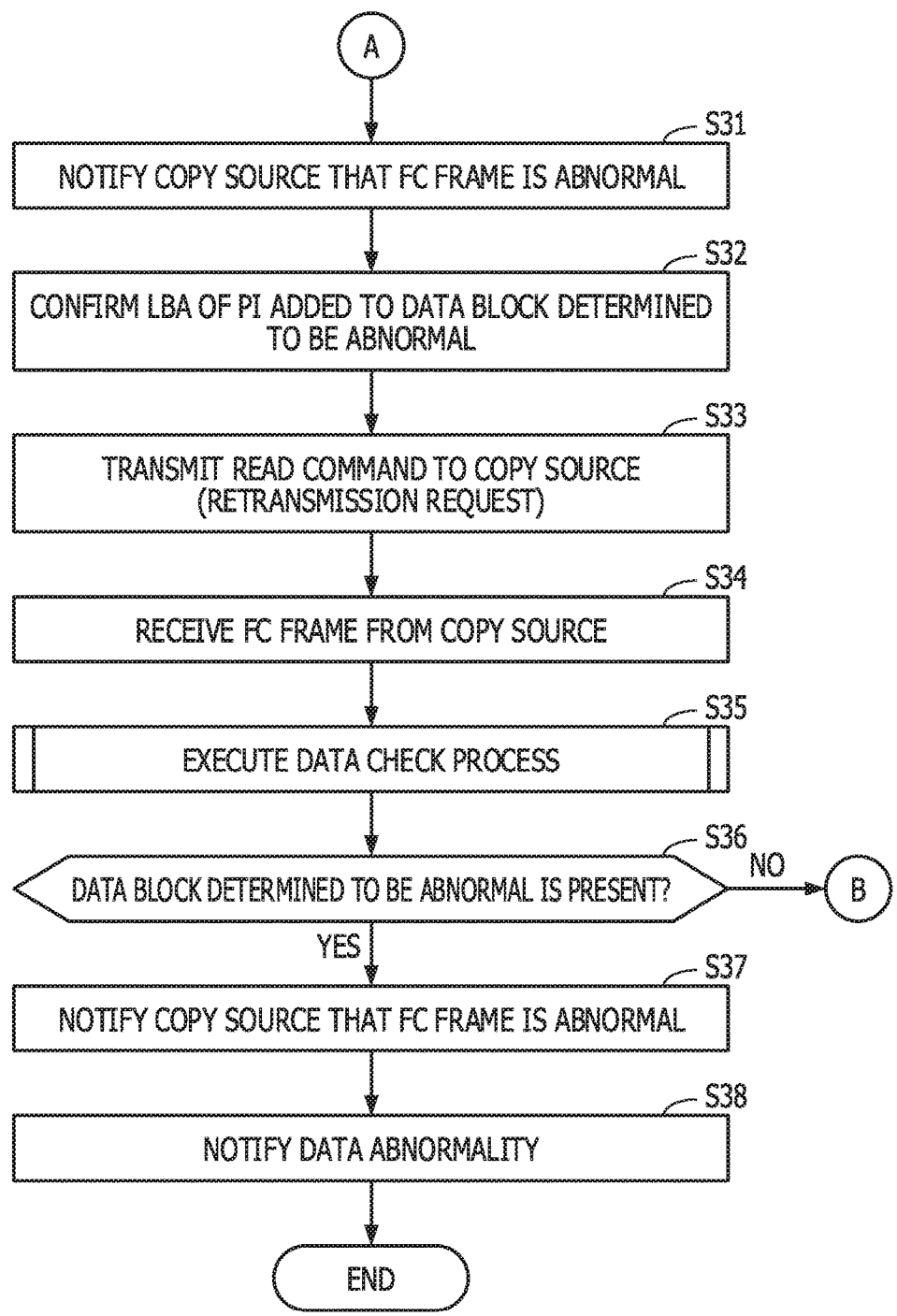
FIG. 10 is a flowchart illustrating the example (2) of the data receiving process of the copy destination.

FIG. 10 is a flowchart illustrating the example (2) of the data receiving process of the copy destination. Hereinafter, the process illustrated in FIG. 10 will be described in order of step numbers.

(S31) The transmission and reception control unit 312 notifies the CM 100 that the FC frame is abnormal.

(S32) The transmission and reception control unit 312 confirms the LBA of PI added to a data block determined to be abnormal in step S24.

(S33) The transmission and reception control unit 312 generates an FC frame (command frame) including a read command. This FC frame is intended to request the CM 100 serving as the copy source to retransmit the data block determined to be abnormal. In the data part of the FC frame, the LBA of the data block determined to be abnormal in step S24 is recorded as the address of the read request destination. The transmission and reception control unit 312 transmits the generated FC frame to the CM 100 serving as the copy source. Thereby, the data block in which an abnormality has been detected is requested to be retransmitted. Additionally, the transmission and reception control unit 312 deletes, from the storage unit 314, the data block determined to be abnormal in step S24.

Here, for example, when only one data block is determined to be abnormal in step S24, the top LBA of the data block and the data length corresponding to one data block are recorded in the data part of an FC frame that is generated. Additionally, as the number of data blocks that are stored in the data part of the data block, "1" is recorded.

Additionally, when there are a plurality of data blocks determined to be abnormal in step S24, a read command may be transmitted for each of these data blocks. However, executing a process as follows may suppress the number of issuances of read commands and reduce the time taken for retransmission.

When two or more data blocks are determined to be abnormal in step S24 and they are consecutive, the top LBA of data blocks on the top side of these data blocks and the data length indicating the length of the entirety of the data blocks are recorded in the data part of an FC frame that is generated. Additionally, as the number of data blocks that are stored in the data part of the data blocks, the number of data blocks determined to be abnormal is recorded.

Additionally, when two or more data blocks are determined to be abnormal in step S24 and they are not consecutive, the transmission and reception control unit 312 requests the entirety of data blocks included in the FC frame received in step S23 to be retransmitted. That is, in the data part of an FC frame that is generated, the top LBA of data blocks on the top side of the data blocks included in the FC frame received in step S23 and the data length indicating the length of the entirety of these data blocks are recorded. Additionally, as the number of data blocks that are stored in the data part of the data blocks, the number of data blocks included in the FC frame received in step S23 is recorded.

(S34) The transmission and reception control unit 312 receives an FC frame (data frame) from the CM 100. The received FC frame includes data blocks requested to be retransmitted. Additionally, PI is added to retransmitted data blocks. The transmission and reception control unit 312 stores the received FC frame in the storage unit 314.

(S35) The check processing unit 313 determines whether or not an abnormality is present in data blocks included in the FC frame received in step S34. Details of this determination process will be described in conjunction with FIG. 12. The check processing unit 313 notifies a determination result to the transmission and reception control unit 312.

(S36) Based on the determination result notified from the check processing unit 313, the transmission and reception control unit 312 determines whether or not a data block determined to be abnormal is present in the FC frame received in step S34. If present, the process proceeds to step S37. If not present, the process proceeds to step S41 in FIG. 11.

(S37) The transmission and reception control unit 312 notifies the CM 100 that the FC frame is abnormal.

(S38) The transmission and reception control unit 312 notifies the copy control unit 311 that an abnormality has occurred in receiving data, and completes the process.

In the above process in FIG. 10, in step S33, among data blocks included in the received FC frame, only an abnormal data block is requested to be retransmitted and, in step S34, the only abnormal data block requested to be retransmitted is received. Thus, the time taken for retransmission may be made shorter than when retransmission is requested in units of FC frames. Accordingly, it is possible to reduce the time taken for receiving the entirety of data requested to be read from the copy control unit 311.

Additionally, in step S33, the same number as the number of data blocks requested to be read is specified as the number of data blocks included in the data part of a data frame that is replied. Thus, the length of the data part of the FC frame received in step S34 is reduced to the minimum desired length. Accordingly, it is possible to ensure that the time taken for retransmission is reduced.

Note that, in the process in FIG. 10, when an abnormal data block is included in an FC frame received in response to a retransmission request, the transmission and reception control unit 312 notifies the copy control unit 311 of a data abnormality and completes the process. However, for example, when an abnormal data block is included in an FC frame received in response to a retransmission request, the transmission and reception control unit 312 may transmit a retransmission request a given number of times until receiving a normal data block. Additionally, after, in step S38, notifying the copy control unit 311 of an abnormality of received data, the transmission and reception control unit 312 may proceed to step S43 in FIG. 11 described below, without completing the process, so as to perform processing of requesting the remaining data, which has not been received, to be read.

Figure 11:
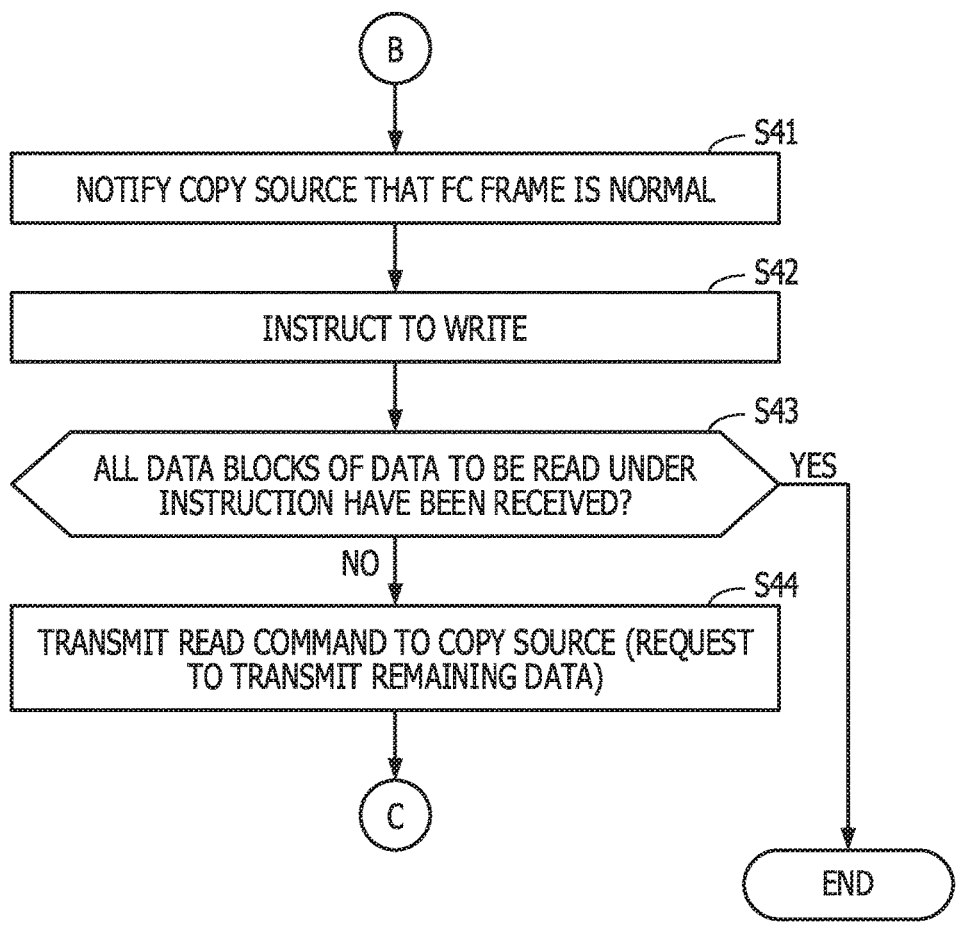
FIG. 11 is a flowchart illustrating the example (3) of the data receiving process of the copy destination.

FIG. 11 is a flowchart illustrating the example (3) of the data receiving process of the copy destination. Hereinafter, the process illustrated in FIG. 11 will be described in order of step numbers.

(S41) The transmission and reception control unit 312 notifies the CM 100 that an FC frame is normal.

(S42) The transmission and reception control unit 312 reads, from the storage unit 314, data blocks determined in step S24 to be normal, out of data blocks in the FC frame received in step S23, and a data block in the FC frame received in step S34. A data block group that is read is such that, among data blocks in the FC frame received in step S23, a data block that has not been normally received is recovered with a retransmitted data block. The transmission and reception control unit 312 transmits the read data block group to the copy control unit 311 and instructs the copy control unit 311 to write the data block group. The copy control unit 311 writes the received data block group to a given area of the DE 400. Thereby, data of the logical volume corresponding to the read data block group is backed up.

(S43) The transmission and reception control unit 312 determines whether or not all the data blocks of data that the transmission and reception control unit 312 has been instructed to read from the copy control unit 311 in step S21 have been received. If all the data blocks have been received, the process is completed. If there is a data block that has not been received, the process proceeds to step S44.

(S44) The transmission and reception control unit 312 transmits, to the CM 100, an FC frame (command frame) including a read command for making a request for reading the remaining data blocks, which have not been received, out of data blocks of data that the transmission and reception control unit 312 has been instructed to read from the copy control unit 311 in step S21. The command frame includes a LUN including the remaining data blocks, which have not been received, the top LBA of these data blocks, and the data length of the entirety of these data blocks. Additionally, as the number of data blocks that are stored in the data part of the data frame, the largest number, "3", is specified. Thereafter, the process proceeds to step S23 in FIG. 9.

Figure 12:
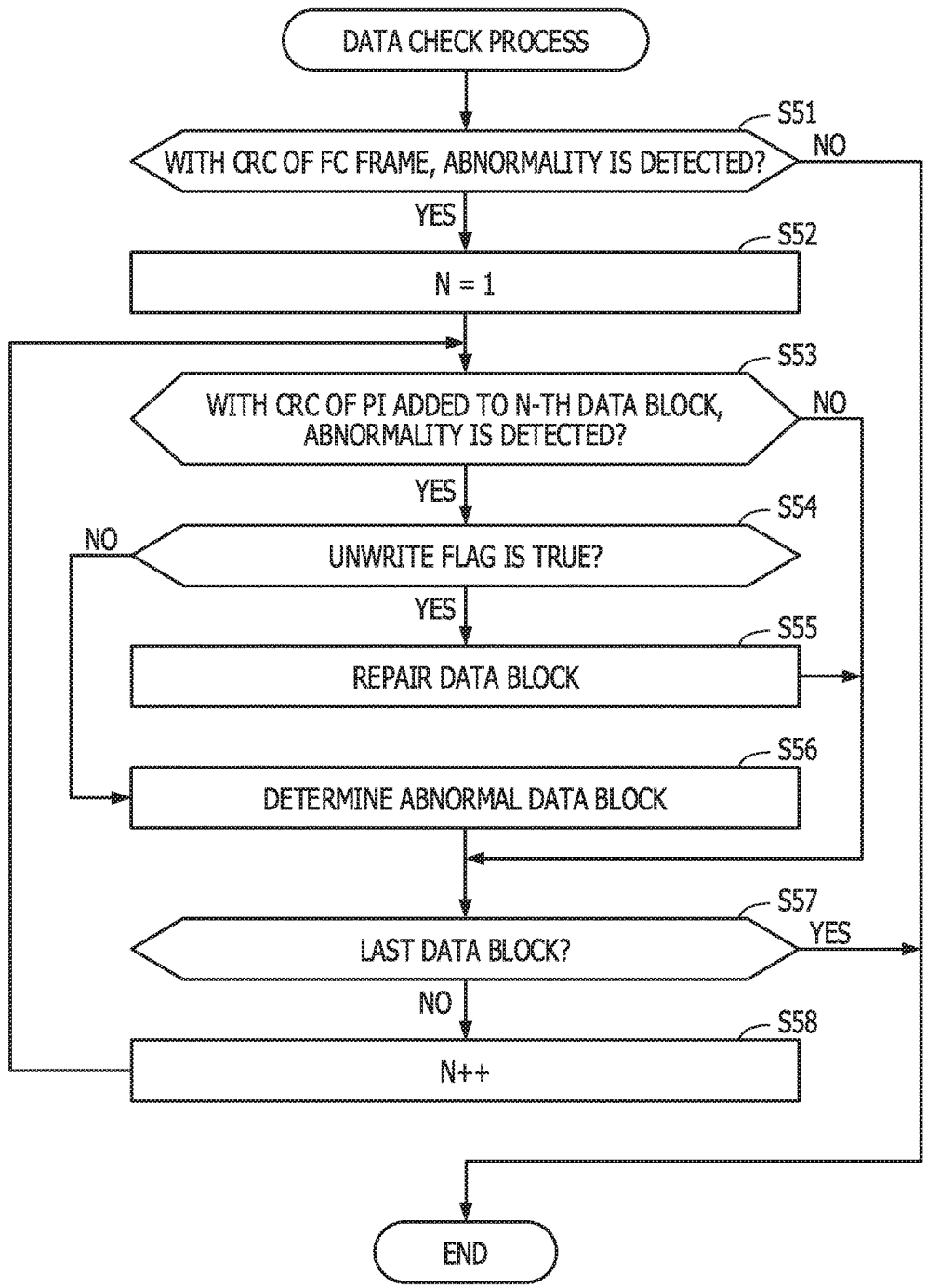
FIG. 12 is a flowchart illustrating an example of a data check process.

FIG. 12 is a flowchart illustrating an example of a data check process. This process in FIG. 12 corresponds to the process in step S24 in FIG. 9 or step S35 in FIG. 10. Hereinafter, the process illustrated in FIG. 12 will be described in order of step numbers.

(S51) With the CRC of the received FC frame, the check processing unit 313 determines whether or not data in the data part of the FC frame is abnormal. When the process in FIG. 12 corresponds to step S24, the FC frame received in step S23 is an object of the determination process. When the process in FIG. 12 corresponds to step S35, the FC frame received in step S34 is an object of the determination process.

Specifically, depending on whether or not the remainder left when data in the data part of the FC frame is divided by a given constant is equal to the CRC of the FC frame, the check processing unit 313 determines whether or not the data in the data part is abnormal. If the remainder and the CRC are different, it is determined that the data of the data part is abnormal, and the process proceeds to step S52. If the remainder and the CRC are equal, it is determined that the data of the data part is normal, and the process in FIG. 12 is completed.

(S52) The check processing unit 313 substitutes 1 for N. Note that N is a variable for specifying a data block included in the data part.

(S53) With the CRC of PI added to an N-th data block, the check processing unit 313 determines whether or not the data block in question is abnormal. In particular, depending on whether or not the remainder left when the data block is divided by a given constant is equal to the CRC of PI, the check processing unit 313 determines whether or not the data block is abnormal. If the remainder and the CRC are different, it is determined that the data block is abnormal, and the process proceeds to step S54. If the remainder and the CRC are equal, it is determined that the data block is normal, and the process proceeds to step S57.

(S54) The check processing unit 313 determines whether or not the unwrite flag of PI added to the N-th data block is true. If true, the process proceeds to step S55. If false, the process proceeds to step S56.

(S55) The check processing unit 313 repairs the N-th data block stored in the storage unit 314 so that it is indicated that the N-th data block is read from an unwritten area. For example, the check processing unit 313 converts the N-th data block stored in the storage unit 314 to zero data in which all the bits are zero. Further, the process proceeds to step S57.

(S56) The check processing unit 313 determines that the N-th data block is an abnormal data block.

(S57) The check processing unit 313 determines whether or not the N-th data block is the last data block included in the data part. If the N-th data block is the last data block, the process in FIG. 12 is completed. If the N-th data block is not the last data block, the process proceeds to step S58.

(S58) The check processing unit 313 increments N. Further, the process proceeds to step S53.

In the above process in FIG. 12, when, even though, in step S53, with the CRC of PI, it is determined that the data block is abnormal, the unwrite flag is true in step S54, the data block is inhibited from being determined to be an abnormal data block. This avoids retransmitting a data block that has been determined to be abnormal, with the CRC, but whose bit content is known, thereby making it possible to reduce the size of data retransmitted to reduce the time taken for retransmission. Additionally, a data block in which the unwrite flag is true is repaired so that it is indicated that the data block has been read from an unwritten area, and thus it is possible to deliver a proper data block to the copy control unit 311.

Next, an example of communication processing between the CM 300 and the CM 100 will be described in conjunction with a sequence diagram.

Figure 13:
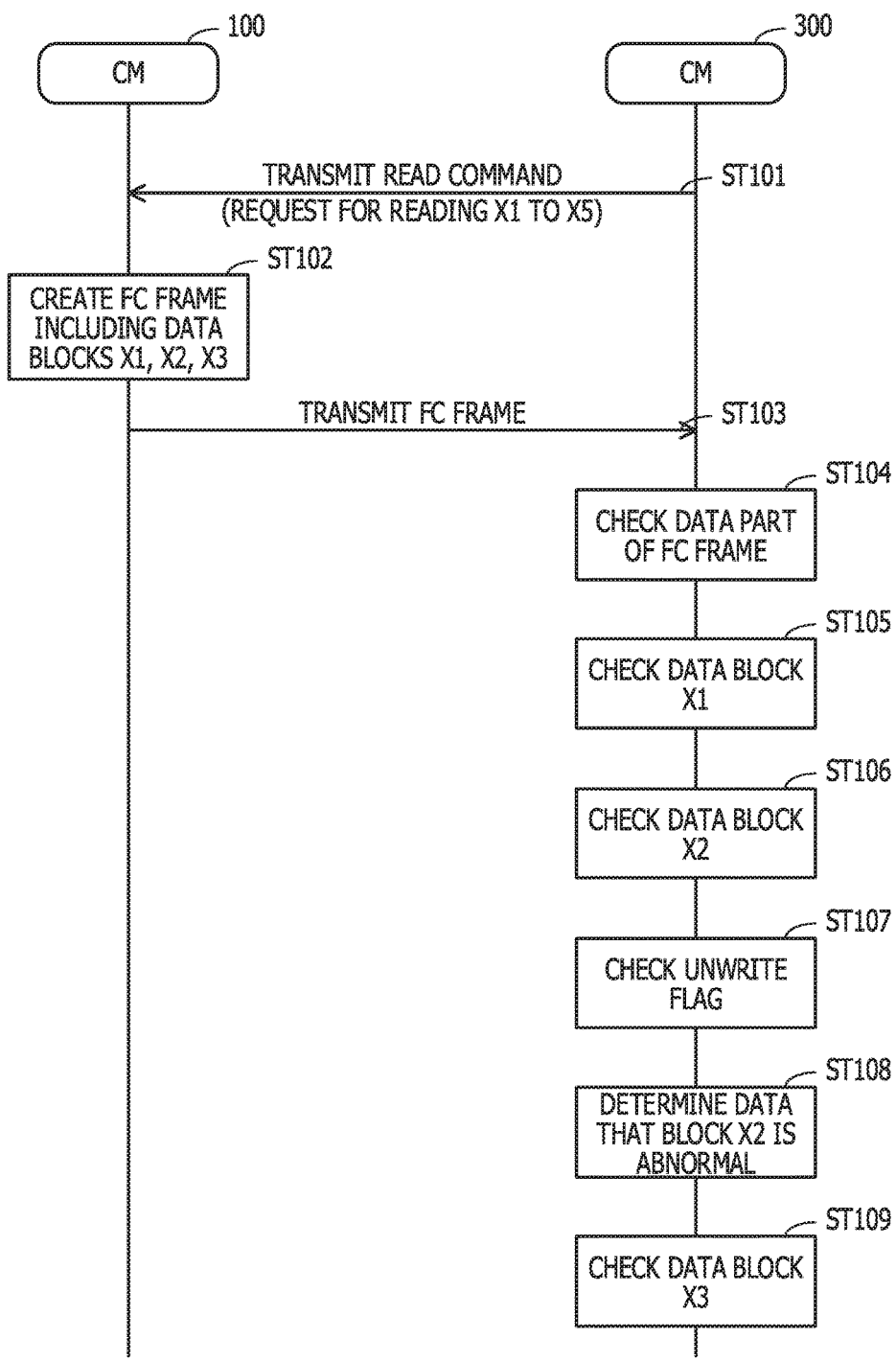
FIG. 13 is a sequence diagram illustrating an example (1) of a back-up process.

FIG. 13 is a sequence diagram illustrating an example (1) of a back-up process. Hereinafter, the process illustrated in FIG. 13 will be described in order of step numbers.

(ST101) The CM 300 transmits, to the CM 100, an FC frame (command frame) including a read command for requesting data blocks X1 to X5 to be read. Note that the data blocks X1 to X5 are recorded in consecutive address areas on some logical volume.

(ST102) The CM 100 adds PI to each of the data blocks X1, X2, and X3. The CM 100 generates an FC frame (data frame) including the data blocks X1, X2, and X3 with the added PI.

(ST103) The CM 100 transmits the FC frame to the CM 300.

(ST104) With the CRC of the received FC frame, the CM 300 checks whether or not data of the data part of the FC frame is abnormal. Here, it is assumed that the data of the data part has been determined to be abnormal.

(ST105) With the CRC of PI added to the data block X1, the CM 300 checks whether or not the data block X1 is abnormal. Here, it is assumed that the data block X1 has been determined to be not abnormal.

(ST106) With the CRC of PI added to the data block X2, the CM 300 checks whether or not the data block X2 is abnormal. Here, it is assumed that the data block X2 has been determined to be abnormal. In this case, the process in the next step, ST107, is performed.

(ST107) The CM 300 confirms the unwrite flag of PI added to the data block X2. Here, it is assumed that the unwrite flag has been determined to be false.

(ST108) From the result of confirmation in step ST107, the CM 300 determines that the data block X2 is an abnormal data block.

(ST109) With the CRC of PI added to the data block X3, the CM 300 checks whether or not the data block X3 is abnormal. Here, it is assumed that the data block X3 has been determined to be not abnormal.

FIG. 14 is a sequence diagram illustrating the example (2) of the back-up process. Hereinafter, the process illustrated in FIG. 14 will be described in order of step numbers.

(ST111) The CM 300 notifies the CM 100 that the FC frame is abnormal.

(ST112) The CM 300 transmits, to the CM 100, an FC frame (command frame) including a read command for requesting retransmission of the data block X2 determined to be abnormal.

(ST113) The CM 100 adds PI to the data block X2. The CM 100 generates an FC frame (data frame) including the data block X2 with the added PI.

(ST114) The CM 100 transmits the FC frame to the CM 300.

(ST115) With the CRC of the received FC frame, the CM 300 checks whether or not data of the data part of the FC frame is abnormal. Here, it is assumed that the data of the data part has been determined to be not abnormal.

(ST116) The CM 300 notifies the CM 100 that the FC frame is normal.

(ST117) The CM 300 transmits, to the CM 100, an FC frame (command frame) including a read command for making a request for reading the data blocks X4 and X5 that have not been received, out of data blocks requested to be read in step ST101.

(ST118) The CM 100 adds PI to each of the data blocks X4 and X5. The CM 100 generates an FC frame (data frame) including the data blocks X4 and X5 with the added PI.

(ST119) The CM 100 transmits the FC frame to the CM 300.

(ST120) With the CRC of the FC frame, the CM 300 checks whether or not data of the data part of the FC frame is abnormal. Here, it is assumed that the data of the data part has been determined to be not abnormal.

(ST121) The CM 300 notifies the CM 100 that the FC frame is normal.

According to the second embodiment described above, in read data that is transmitted to the CM 300 with an FC frame, PI including a CRC is added to each data block. When the CM 300 detects an abnormality for data of the data part of the received FC frame, the CM 300 detects an abnormal data block using the CRC of PI. The CM 300 requests the CM 100 to retransmit only data blocks detected to be abnormal.

Thus, compared with the case where retransmission is requested based only on the CRC of an FC frame, the time taken for retransmission may be reduced. That is, in the case based only on the CRC of an FC frame, the retransmission request is performed in units of FC frames. In this case, even when a normal data block is included in data blocks included in the FC frame, retransmission is requested for all the data blocks in the FC frame. Thus, since even a data block that has been able to be normally received is retransmitted, extra time is taken for the retransmission. In contrast to this, according to the second embodiment, since the CM 100 is requested to retransmit only data blocks determined to be abnormal, it is possible to reduce the size of data to be retransmitted to reduce the time taken for retransmission. As a result, the time taken for receiving the entirety of data requested to be read by the copy control unit 311 may be reduced.

Note that, in the second embodiment, the example in which the processing of the transmission and reception control unit 312 and the check processing unit 313 is achieved by the CA 306 has been described. However, the processing of the transmission and reception control unit 312 and the check processing unit 313 is not limited to this and, for example, may be achieved by the processor of the CM 300 executing a given program. In this case, the transmission and reception control unit 312 communicates with the CM 100 through the CA 306. Likewise, the processing of the transmission and reception control unit 112 may be achieved by the processor 101 of the CM 100 executing a given program. In this case, the transmission and reception control unit 112 communicates with the transmission and reception control unit 312 through the CA 106.

In addition, in the second embodiment, the case where data stored in the CM 100 is transmitted to the CM 300 is illustrated. By way of non-limiting example, the procedure of checking a data abnormality and retransmission illustrated in the second embodiment is applicable to communication performed between the host device 500 and the CM 100. In this case, an FC frame is used for communication between the host device 500 and the CM 100, and PI is added to a data block included in the FC frame. Further, for example, when the CM 100 detects an abnormality in the data part of an FC frame transmitted from the host device 500, the CM 100 detects an abnormal data block using the CRC of PI. The CM 100 requests the host device 500 to retransmit only the data block detected to be abnormal.

Note that the information processing of the first embodiment may be achieved by causing a processor used in the receiving device 2 to execute a program. The information processing of the CM 100 in the second embodiment may be achieved by causing the processor 106a included in the CA 106 or the processor 101 included in the CM 100 to execute a program. The information processing of the CM 300 in the second embodiment may be achieved by causing the processor 306a included in the CA 306 or a processor included in the CM 300 to execute a program. These programs may be recorded on a computer-readable recording medium.

For example, by distributing a portable recording medium on which programs are recorded, the programs are able to be circulated. Additionally, for example, programs that implement the functionality corresponding to the copy control unit 311, the transmission and reception control unit 312, and the check processing unit 313 included in the CM 300 are set as individual programs, and each program may be individually distributed. The functionality of the copy control unit 311, the transmission and reception control unit 312, and the check processing unit 313 included in the CM 300 may be implemented by individual computers. Computers may, for example, store (install) programs recorded on a portable recording medium in their own storage devices such as RAM or SSDs, read the programs from the storage devices, and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
    a transmitting device including a first memory and a first processor coupled to the first memory; and
    a receiving device including a second memory and a second processor coupled to the second memory, wherein
    the first processor is configured to transmit a data group including a plurality of data blocks, each of the plurality of data blocks includes a first error check code, and the data group includes a second error check code, and
    the second processor is configured to:
        receive the data group from the transmitting device,
        based on the second error check code, determine whether an error is present in the data group,
        when it is determined that the error is present in the data group, determine, based on the first error check code, in which data block of the plurality of data blocks the error is present, and
        when the error is present in a first data block of the plurality of data blocks, transmit, to the transmitting device, a request for retransmission of the first data block among the plurality of data blocks, wherein
    the transmitting device is a first storage device including a plurality of storage areas corresponding to the plurality of data blocks respectively,
    the receiving device is a second storage device configured to back up copy data of data stored in the first storage device,
    the data group includes determination information indicating whether each of the plurality of storage areas in the first storage device is an unwritten area, and
    when the determination information indicates that a first storage area of the plurality of storage areas corresponding to the first data block is the unwritten area, the second processor does not transmit the request to the transmitting device.

2. The system according to claim 1, wherein
the first processor is configured to:
    receive the request for retransmission of the first data block,
    select the first data block from the plurality of data blocks, and
    transmit the selected first data block to the receiving device.

3. The system according to claim 1, wherein
the first error check code is a cyclic redundancy check (CRC), and
the second error check code is the CRC.

4. The system according to claim 1, wherein
the first processor is further configured to:
    when the determination information indicates that the first storage area is the unwritten area, convert all data included in the first data block into a certain value, and
    transmit, to the second storage device, the first data block with the certain value.

5. A receiving device configured to be coupled to a transmitting device, the transmitting device being configured to transmit a data group including a plurality of data blocks, each of the plurality of data blocks including a first error check code, and the data group including a second error check code, the receiving device comprising:

a memory; and
a processor coupled to the memory and configured to:
receive the data group from the transmitting device,
based on the second error check code, determine whether an error is present in the data group,
when it is determined that the error is present in the data group, determine, based on the first error check code, in which data block of the plurality of data blocks the error is present, and
when the error is present in a first data block of the plurality of data blocks, transmit, to the transmitting device, a request for retransmission of the first data block among the plurality of data blocks, wherein
the transmitting device is a first storage device including a plurality of storage areas corresponding to the plurality of data blocks respectively,
the receiving device is a second storage device configured to back up copy data of data stored in the first storage device,
the data group includes determination information indicating whether each of the plurality of storage areas in the first storage device is an unwritten area, and
when the determination information indicates that a first storage area of the plurality of storage areas corresponding to the first data block is the unwritten area, the processor does not transmit the request to the transmitting device.

6. The receiving device according to claim 5, wherein the transmitting device is configured to:
receive the request for retransmission of the first data block,
select the first data block from the plurality of data blocks, and
transmit the selected first data block to the receiving device.

7. The receiving device according to claim 5, wherein the first error check code is a cyclic redundancy check (CRC), and
the second error check code is the CRC.

8. The receiving device according to claim 5, wherein the transmitting device is further configured to:
when the determination information indicates that the first storage area is the unwritten area, convert all data included in the first data block into a certain value, and
transmit, to the second storage device, the first data block with the certain value.

9. A method using a transmitting device and a receiving device, the method comprising:
transmitting, by the transmitting device, a data group including a plurality of data blocks, each of the plurality of data blocks including a first error check code, and the data group including a second error check code;
receiving, by the receiving device, the data group from the transmitting device;
based on the second error check code, determining, by the receiving device, whether an error is present in the data group;
when it is determined that the error is present in the data group, determining, by the receiving device, based on the first error check code, in which data block of the plurality of data blocks the error is present; and
when the error is present in a first data block of the plurality of data blocks, transmitting, from the receiving device to the transmitting device, a request for retransmission of the first data block among the plurality of data blocks, wherein the transmitting device is a first storage device including a plurality of storage areas corresponding to the plurality of data blocks respectively,
the receiving device is a second storage device configured to back up copy data of data stored in the first storage device,
the data group includes determination information indicating whether each of the plurality of storage areas in the first storage device is an unwritten area, and
when the determination information indicates that a first storage area of the plurality of storage areas corresponding to the first data block is the unwritten area, the receiving device does not transmit the request to the transmitting device.

10. The method according to claim 9 further comprising:
receiving, by the transmitting device, the request for retransmission of the first data block;
selecting, by the transmitting device, the first data block from the plurality of data blocks; and
transmitting, by the transmitting device, the selected first data block to the receiving device.

11. The method according to claim 9, wherein the first error check code is a cyclic redundancy check (CRC), and
the second error check code is the CRC.

12. The method according to claim 9 further comprising:
when the determination information indicates that the first storage area is the unwritten area, converting, by the transmitting device, all data included in the first data block into a certain value; and
transmitting, from the transmitting device to the second storage device, the first data block with the certain value.

13. A system comprising:
a transmitting device including a first memory and a first processor coupled to the first memory; and
a receiving device including a second memory and a second processor coupled to the second memory, wherein
the first processor is configured to transmit a data group including a plurality of data blocks, each of the plurality of data blocks includes a first error check code, and the data group includes a second error check code, and
the second processor is configured to:
receive the data group from the transmitting device,
based on the second error check code, determine whether an error is present in the data group,
when it is determined that the error is present in the data group, determine, based on the first error check code, in which data block of the plurality of data blocks the error is present, and
when the error is present in a first data block of the plurality of data blocks, transmit, to the transmitting device, a request for retransmission of the first data block among the plurality of data blocks, wherein:
the transmitting device is a first storage device including a plurality of storage areas corresponding to the plurality of data blocks respectively,
each of the plurality of data blocks includes determination information indicating whether each of the plurality of storage areas in the first storage device is an unwritten area which does not include valuable data, and
when the determination information indicates that a first storage area of the plurality of storage areas corresponding to the first data block is the unwritten area, the processor does not transmit the request to the transmitting device even when the error is present in the first data block, and changes data included in the received first data block to zero data, and when the determination information indicates that the first storage area is not the unwritten area, the processor transmits the request to the transmitting device when the error is present in the first data block.

14. A receiving device configured to be coupled to a transmitting device, the transmitting device being configured to transmit a data group including a plurality of data blocks, each of the plurality of data blocks including a first error check code, and the data group including a second error check code, the receiving device comprising:

a memory; and a processor coupled to the memory and configured to:
  receive the data group from the transmitting device,
  based on the second error check code, determine whether an error is present in the data group,
  when it is determined that the error is present in the data group, determine, based on the first error check code, in which data block of the plurality of data blocks the error is present, and when the error is present in a first data block of the plurality of data blocks, transmit, to the transmitting device, a request for retransmission of the first data block among the plurality of data blocks, wherein:

the transmitting device is a first storage device including a plurality of storage areas corresponding to the plurality of data blocks respectively, each of the plurality of data blocks includes determination information indicating whether each of the plurality of storage areas in the first storage device is an unwritten area which does not include valuable data, and when the determination information indicates that a first storage area of the plurality of storage areas corresponding to the first data block is the unwritten area, the second processor does not transmit the request to the transmitting device even when the error is present in the first data block, and changes data included in the received first data block to zero data, and when the determination information indicates that the first storage area is not the unwritten area, the second processor transmits the request to the transmitting device when the error is present in the first data block.

* * * * *